(12) United States Patent
Vansompel et al.

(10) Patent No.: US 11,387,710 B2
(45) Date of Patent: Jul. 12, 2022

(54) STATOR FOR AN AXIAL FLUX MACHINE AND METHOD FOR PRODUCING THE SAME

(71) Applicants: UNIVERSITEIT GENT, Ghent (BE); MAGNAX BVBA, Deinze (BE)

(72) Inventors: Hendrik Vansompel, Moerbeke-Waas (BE); Peter Sergeant, Lovendegem (BE); Peter Leijnen, Bachte-Maria-Leerne (BE)

(73) Assignees: UNIVERSITEIT GENT, Ghent (BE); MAGNAX BVBA, Deinze (BE)

( * ) Notice: Subject to any disclaimer, the term of this patent is extended or adjusted under 35 U.S.C. 154(b) by 530 days.

(21) Appl. No.: 16/318,199

(22) PCT Filed: Jul. 14, 2017

(86) PCT No.: PCT/EP2017/067854
§ 371 (c)(1),
(2) Date: Jan. 16, 2019

(87) PCT Pub. No.: WO2018/015293
PCT Pub. Date: Jan. 25, 2018

(65) Prior Publication Data
US 2019/0288584 A1    Sep. 19, 2019

(30) Foreign Application Priority Data
Jul. 18, 2016 (EP) ..................................... 16179996

(51) Int. Cl.
*H02K 9/22* (2006.01)
*H02K 1/18* (2006.01)
(Continued)

(52) U.S. Cl.
CPC ............... *H02K 9/22* (2013.01); *H02K 1/182* (2013.01); *H02K 1/14* (2013.01); *H02K 15/02* (2013.01);
(Continued)

(58) Field of Classification Search
CPC ............ H02K 1/14; H02K 1/182; H02K 9/22; H02K 15/02; H02K 15/028; H02K 15/14;
(Continued)

(56) References Cited

U.S. PATENT DOCUMENTS 6,247,906 B1 * 6/2001 Pijanowski ............ H02K 41/06
417/410.4
10,135,310 B2 * 11/2018 Schuler .................... H02K 1/32
(Continued)

FOREIGN PATENT DOCUMENTS

| | | |
|---|---|---|
| DE | 10048492 A1 | 4/2002 |
| JP | 2000295801 A | 10/2000 |
| WO | 2010092400 A2 | 8/2010 |

OTHER PUBLICATIONS

Extended European Search Report from EP Application No. 16179996.0, dated Oct. 7, 2016.
(Continued)

*Primary Examiner* — Rashad H Johnson
(74) *Attorney, Agent, or Firm* — Workman Nydegger

(57) ABSTRACT

A yokeless stator for an axial flux machine, comprising a housing, the housing comprising a circumferential portion and a plurality of elongated portions extending radially inwards therefrom, and a plurality of discrete stator teeth arranged within the circumferential portion, each discrete stator tooth comprising a ferromagnetic material and an electrical winding; the housing further comprising an electrically isolating filling material filling empty space inside the housing. The circumferential portion of the housing is
(Continued)

made of a first non-ferromagnetic material and the elongated portions are made of a second non-ferromagnetic material. The housing comprises a laminated structure, which comprises at least part of the plurality of inwardly directed elongated portions.

19 Claims, 12 Drawing Sheets

(51) Int. Cl.
*H02K 1/14* (2006.01)
*H02K 21/24* (2006.01)
*H02K 15/14* (2006.01)
*H02K 15/02* (2006.01)

(52) U.S. Cl.
CPC ........... *H02K 15/028* (2013.01); *H02K 15/14* (2013.01); *H02K 21/24* (2013.01); *Y10T 29/49009* (2015.01); *Y10T 29/49078* (2015.01)

(58) Field of Classification Search
CPC .............. H02K 21/14; Y01T 29/49009; Y01T 29/49078
USPC ............... 29/596; 310/44, 49.07, 64, 154.05, 310/156.32, 156.37, 216.002, 216.006, 310/216.045
See application file for complete search history.

(56) References Cited

U.S. PATENT DOCUMENTS

| | | | |
|---|---|---|---|
| D841,703 S * | 2/2019 | Igarashi | D15/138 |
| 2007/0075604 A1* | 4/2007 | Hsu | H02K 15/024 310/214 |
| 2008/0098587 A1 | 5/2008 | Mitsui et al. | |
| 2010/0148611 A1* | 6/2010 | Wang | H02K 21/24 310/156.37 |
| 2011/0095628 A1* | 4/2011 | Enomoto | H02K 1/148 310/44 |
| 2011/0316381 A1* | 12/2011 | Asano | H02K 1/148 310/216.045 |
| 2014/0009009 A1 | 1/2014 | Deguchi et al. | |
| 2015/0364956 A1 | 12/2015 | Woolmer et al. | |
| 2017/0025927 A1* | 1/2017 | Weerts | H02K 9/06 |
| 2017/0155291 A1* | 6/2017 | Deàk et al. | H02K 1/182 |

OTHER PUBLICATIONS

International Search Report from PCT Application No. PCT/EP2017/067854, dated Oct. 4, 2017.
Parviainen, "Design of Axial-Flux Permanent-Magnet Low-Speed Machines and Performance Comparison Between Radial-Flux and Axial-Flux Machines," Lappeenranta University of Technology, Apr. 19, 2005, 155 Pages.
Zhang et al., "Mechanical Construction and Analysis of an Axial Flux Segmented Armature Torus Machine," International Conference on Electrical Machines, Sep. 2, 2014, pp. 1293-1299.

* cited by examiner

200

STATOR FOR AN AXIAL FLUX MACHINE AND METHOD FOR PRODUCING THE SAME

FIELD OF THE INVENTION

The invention relates to the field of axial flux electrical machines. More specifically, the present invention relates to a stator for an axial flux electrical machine and to a method of producing the same.

BACKGROUND OF THE INVENTION

Many different types of electrical machines (both motors and generators) exist in the prior art, e.g. brushless DC (BLDC) motors/generators, synchronous or asynchronous AC motors/generators, switched reluctance motors/generators (SRM), axial flux (AF) motors/generators, etc., and each type has its specific advantages and disadvantages, e.g. in terms of the physical machine itself, in terms of its driving circuit (e.g. requiring a DSP or a simple microcontroller), in terms of required sensors (e.g. current sensor, position sensor), in terms of characteristics (e.g. torque ripple), etc.

The present invention is concerned with the type of "axial flux machines", and more in particular, with so called yokeless axial flux machines.

Axial flux machines per se are known in the art, for example from WO2010/092400 and US2015/0364956, and hence, the basic principles of operation need not be explained here.

A reader not familiar with axial flux machines may consult the thesis: "Design of axial flux permanent magnet low-speed machines and performance comparison between radial-flux and axial-flux machines", by A. Parvainen, 2005, PhD Lappeenranta University of Technology. In FIG. 1.3 of said thesis, replicated herein as FIGS. 12(*a*) to 12(*d*), several axial flux topologies are shown: (a) single sided machines, (b) machines with double stator and single rotor; (c) machines with double rotor and single stator; (d) multi-stage machines. The present invention only concerns topologies (c) and (d).

Within these two topologies, two variants are possible, depending on the orientation of the magnets on the two rotor discs: the torus type and the yokeless and segmented armature (YASA) type. This is illustrated in FIG. 13. The present invention only concerns the second variant: the YASA type. This variant has no stator yoke, whereas the first variant does have a stator yoke. FIG. 13 clearly demonstrates the necessity of this yoke to close the magnetic circuit in the first variant, whereas the magnetic circuit is closed without the use of a yoke in the second (YASA) variant. The dotted lines illustrate the magnetic field lines. The above machines have slots for the windings on the stator.

FIG. 14 shows a schematic configuration of the YASA type machine with slots. Further information can be found in [J. Gieras, R. Wang, M. Kamper, Axial Flux Permanent Magnet Brushless Machines, Kluwer, 2004, ISBN: 1-4020-2661-7].

As the present invention is mainly related to the construction of the stator, reference is also made to the publication "*Mechanical Construction and Analysis of an Axial Flux Segmented Armature Torus Machine*" (B. Zhang, Y. Wang, M. Doppelbauer, and M. Gregor, International Conference on Electrical Machines (ICEM), Sep. 2-5, 2014, Berlin, pp. 1293-1299).

Advantages of axial flux machines over radial flux machines are for example the higher power and torque density which are inherent to this type of machine, and which, in case of YASA machines, are combined with a higher efficiency which is mainly due to the absence of the stator yoke and its associated losses.

The YASA topology does, however, raise some technical challenges. The compactness increases the importance of and technical difficulties in cooling the machine. Furthermore, there is a challenge related to mechanically fixing the discrete stator teeth in the machine with appropriate accuracy and sufficient rigidness.

Document DE 100 48 492 discloses a stator for an axial field electrical machine. The stator has a number of stator coils contained within a stator housing having a stator ring with a number of inwardly projecting radial spokes between which the coils are located. Each coil has a coil core of a ferromagnetic material and an outer stator winding. The coils are arranged between the radial spokes and are glued to these. The coils lie in thermal contact with the adjacent radial spokes and the inner peripheral surface of the stator ring.

Application US2014/009009 relates to an axial gap rotating electric machine. The stator includes a number of stator cores arranged in circumferential direction. Coils are configured to wind the peripheries of the respective stator cores. A resin molds the stator cores wound with the coils. The stator cores each include a protruding portion protruding partly from the coil in the direction of axis of rotation. A conductive member is provided so as to come into contact with peripheral surfaces of the protruding portions of the stator cores.

JP 2000 295801 presents a divided stator core for a radial flux machine. A plurality of core blocks comprises laminated ferromagnetic steel sheets. Each core block has a comb-shaped part which is made to protrude on the outer circumference side of the adjacent core block and plastically deformed. A protruding bent tab or a notch is formed on the surface of each ferromagnetic steel sheet which is brought into contact with the electromagnetic steel sheet belonging to the adjacent core block.

US2008/098587 discloses a method for manufacturing a laminated stator core of a radial flux machine. A yoke body of the ferromagnetic stator core is laminated.

SUMMARY OF THE INVENTION

It is an object of embodiments of the present invention to provide a yokeless stator for an axial flux electrical machine, and an axial flux machine comprising such a yokeless stator, wherein the yokeless stator and the axial flux electrical machine have a structure with good or improved mechanical stability and/or a good or improved cooling capacity, while avoiding that a cooling liquid comes close to or near the stator teeth or stator coils.

It is also an object of embodiments of the present invention to provide a method of producing such a yokeless stator and a method of producing such an axial flux electrical machine, wherein the method is relatively easy to perform, in particular in terms of accurately positioning the stator teeth in a manner which does not negatively influence mechanical stability and/or cooling capacity or both.

These objectives are accomplished by a method and a device according to embodiments of the present invention.

According to a first aspect, the present invention provides a yokeless stator for an axial flux electrical machine, comprising: a housing comprising a circumferential portion; a plurality of discrete stator teeth arranged within the circumferential portion, each discrete stator tooth comprising a ferromagnetic material and an electrical winding wound around said ferromagnetic material; the housing further comprising a plurality of elongated portions extending in a radially inward direction from said circumferential portion, the elongated portions having a proximal end being mechanically connected to the circumferential portion and being in thermal contact with said circumferential portion, and having a distal portion or distal end being physically located between electrical windings of adjacent stator teeth; an electrically isolating filling material filling empty space within said circumferential portion between said plurality of stator teeth and said plurality of elongated portions. The circumferential portion of the housing is made of a first non-ferromagnetic material and the elongated portions are made of a second non-ferromagnetic material. The housing comprises a laminated structure. This laminated structure comprises at least some of said plurality of inwardly directed elongated portions. Due to the high magnetic reluctance of the non-ferromagnetic material, the non-ferromagnetic structure does not form part of the magnetic circuit.

The plurality of discrete stator teeth is preferably arranged at equidistant angular positions inside the circumferential portion.

It is an advantage that the elongated portions can fulfil four functions: (1) to define cavities for receiving the discrete stator teeth during assembly, (2) to hold the discrete stator teeth in position during production of the stator, (3) to hold the discrete stator teeth in position during actual use of the axial flux machine, and (4) to cool the stator teeth during actual use of the machine by evacuating heat from the inside of the stator to the circumference.

The elongated portions may be integrally formed with the circumferential portion of the housing, but that is not absolutely required. In some embodiments they may be formed separately from the circumferential portion before being fixedly mounted thereto.

It is a major advantage of the elongated portions that they serve both as mechanically holding means during operation of the machine (by providing structural strength to resist forces exerted upon the stator teeth, in particular tangential forces), and at the same time significantly decrease the thermal resistance of the medium through which the heat can flow from the location where the heat is created (the stator teeth and the windings) and the location where the heat is dissipated (the circumference), during normal operation of the machine. In other words, the elongated portions provide for an increased cooling capacity inside the stator structure. This advantage should not be underestimated.

A machine having such elongated portions offers an improved power density, which means that a machine having such elongated portions can have a higher power than the same machine without such elongated portions.

It is a major advantage of this machine that it does not require internal water cooling, especially since water-cooling adds to the complexity due to the need of additional equipment such as pumps. Nevertheless, the machine is compatible with water cooling strategies. The housing can be cooled from the outside in any conventional manner, for example by means of forced air, or water cooling, etc. In some embodiments it is possible to provide water channels in the circumferential portion of the housing.

It is advantageous that the empty spaces are filled with filling material, without leaving air bubbles, because resin has a better thermal conductance than air (for example: about 0.3 W/m·K for resin, and about 0.026 W/m·K for air).

Preferably the elongated portions extend radially inwards as far as the innermost radial positions of the stator teeth, or even beyond, because this allows for more heat transfer, and thus improved cooling capacity.

In an embodiment the stator further comprises a central element arranged inside said housing; the plurality of discrete stator teeth being arranged in a space between the circumferential portion and the central element; the elongated portions extending in a radially inward direction from said circumferential portion towards the central element; an electrically isolating filling material filling empty space between said circumferential portion and the central element and said plurality of stator teeth and said plurality of elongated portions.

In an embodiment the central element is an element adapted for holding a bearing.

In an embodiment the central element is or comprises a bearing.

In an embodiment the first non-ferromagnetic material and said second non-ferromagnetic material are identical.

In an embodiment the stator housing comprises a plurality of laminations stacked on top of each other, the laminations having a shape comprising at least a part of the circumferential portion.

The elongated portions forming part of the laminated structure are in one embodiment electrically isolated from each other. Circulating currents known as "eddy currents" are so avoided. In another embodiment, wherein a comb-shaped element connects the various laminations of the elongated portions via the back of that comb-shaped element, the electrical isolation is obviously only partially. Even in this case eddy currents are largely avoided. Put in different words, the various laminations of the elongated portions may be fully electrically isolated from each other, or may be connected to each other at either their radially innermost or outermost point, but not at both points together.

It is an advantage of providing a housing made of electrically isolated laminations as opposed to a monolithic piece of electrically conductive material, because laminations allow further reducing losses due to eddy currents. A thin oxide layer or coating layer may suffice as isolation. The laminations may have a thickness in the range from 1.0 mm to 6.0 mm, for example in the range from 1.0 mm to 4.0 mm, for example in the range from 1.5 mm to 2.5 mm.

In an embodiment at least some of the laminations comprise two or more lamination segments, each having the part of the circumferential portion spanning an arc smaller than 360°.

In an embodiment at least some of the laminations further comprise a plurality of radially inwardly directed elongated portions formed integrally with the circumferential portion.

It is an advantage that such laminations can be easily produced using classical production techniques, such as cutting, punching, stamping, laser cutting, plasma cutting, etc. It is a further advantage that the elongated portions are integrally formed with the circumferential portion, thus by definition providing excellent mechanical contact and excellent thermal contact and automatically leading to correct positioning of the stator teeth. It is an advantage that in this case no brazing or soldering or other fastening techniques are required to connect e.g. comb-shaped elements to the circumferential portion.

In an embodiment all of the laminations are identical; or the laminations comprise a first type of laminations that comprise a plurality of radially inwardly directed elongated portions formed integrally with the circumferential portion, and a second type of laminations that comprise only a circumferential portion but no radially inwardly directed elongated portions.

In case all laminations have elongated portions, they are preferably coated or anodized or otherwise provided with an isolation layer to prevent electrical contact between elongated portions of neighbouring laminations.

In case two types of laminations are used, coating or oxidation or other forms of isolation of the laminations can be omitted, without increasing losses due to eddy currents, because eddy currents are small at the circumference of the housing, and are prevented in the elongated portions due to an axial distance.

In an embodiment at least some of the laminations comprise a plurality of notches or grooves for mounting one or more of said plurality of elongated portions. The elongated portions are optionally comprised in a plurality of comb-shaped elements.

In an embodiment an inner wall of the circumferential portion of the housing comprises a plurality of notches or grooves.

In an embodiment the stator housing comprises a monolithic annular body as the circumferential portion.

It is an advantage of this embodiment that the annular body can be produced as a single piece, which can provide production advantages. Another advantage of this embodiment is that a monolithic body, made of a single piece, may improve mechanical stability even further. It is believed that the losses due to eddy currents flowing in this annular structure are relatively small, moreover, any heat generated therein can be directly transferred to the outside environment.

It is an advantage that such materials offer a relatively low magnetic permeability and a relatively high thermal conductivity. Preferably aluminium or copper or aluminium alloys or copper alloys are used. Another advantage of aluminium (or aluminium alloys) is its low mass density (only about 2700 kg/m$^3$, as compared to copper: about 8900 kg/m$^3$, or steel: 7800 kg/m$^3$). The first non-ferromagnetic material may be the same as the second non-ferromagnetic material, or may be different. An advantage of using the same non-ferromagnetic material is that it may be easier to connect via welding or soldering or brazing. Another advantage is that the structure will experience the same thermal expansion (same thermal expansion coefficient), which reduces thermal stress.

In an embodiment the filling material is a resin or comprises a resin and fibrous material.

Preferably a resin with a relatively high thermal conductivity (e.g. at least 0.2 W/m·K), and a relatively low electrical conductivity (e.g. lower than $1 \times 10^{16}$ Ohm·cm), and a relatively low magnetic permeability is chosen.

It is an advantage of using a resin with a relatively low viscosity (e.g. lower than 500 mPa·s at a temperature in the range from 50° C. to 250° C.), in that it easily flows and fills all gaps, so as to leave substantially no air bubbles.

Preferably a resin is chosen which has sufficient mechanical strength and does not become weak even at a working temperature up to 200° C. or even up to 225° C. or even up to 250° C. (temperature class IEC60085). In a particular embodiment, the resin is a thermosetting resin such as epoxy, BMI resin, benzoxazine resin, phenolic resin or a thermoplastic resin such as PA, PPS, PPSU, PAI, PEEK.

It is an advantage if the resin further comprises fibres selected from the group of non-electrically conducting materials such as glass fibres or aramid fibres, with a length from 3 mm to 15 mm or a powder selected from the group consisting of inorganic fillers such as alumina, silica, wollastonite, boron nitride or aluminium nitride or organic additives such as CSR (Core-Shell rubber) impact modifiers or other polymer toughening agents to further improve mechanical and/or thermal properties.

According to a second aspect, the present invention provides an axial flux electrical machine comprising: a yokeless stator according to the first aspect and at least one rotor rotatably mounted to said stator.

According to a third aspect, the present invention provides a method of producing a yokeless stator for an axial flux electrical machine. The method comprises: a) providing a housing comprising a circumferential portion made of a first non-ferromagnetic material and a plurality of elongated portions made of a second non-ferromagnetic material and extending from said circumferential portion in a radially inward direction, the elongated portions having a proximal end which is mechanically connected to the circumferential portion and is in thermal contact with said circumferential portion, the elongated portions being adapted for defining a plurality of cavities for receiving a plurality of discrete stator teeth; at least some of said elongated portions being comprised in a laminated structure of said stator housing: b) arranging the plurality of discrete stator teeth in said plurality of cavities, each discrete stator tooth comprising a ferromagnetic material or ferromagnetic core and an electrical winding wound around said ferromagnetic material or ferromagnetic core; c) increasing a temperature of the arrangement to a temperature in the range from 50° C. to 250° C., and while maintaining this temperature, filling empty space within said circumferential portion with an electrically isolating filling material; d) allowing the filling material to harden and/or cure.

In an embodiment the method further comprises a step x) between step a) and step b) or between step b) and step c) of arranging a central element or a bearing inside said housing.

In an embodiment the method further comprise a step e), following step d), of actively or passively cooling the stator.

In an embodiment step a) comprises one of the following alternatives: i) stacking a plurality of laminations on top of each other, at least some of said laminations having a shape comprising a circumferential portion and a plurality of elongated portions extending from said circumferential portion in a radially inward direction; ii) stacking a plurality of laminations on top of each other, a first group of said laminations having a first shape comprising a circumferential portion and a plurality of elongated portions extending from said circumferential portion in a radially inward direction, a second group of said laminations having a shape comprising only an outer circumferential portion without elongated portions extending from said circumferential portion in a radially inward direction; iii) stacking a plurality of laminations on top of each other, at least some of said laminations having a shape comprising a circumferential portion and a plurality of notches for mounting one or more of said plurality of elongated portions comprised in a comb-shaped element; iv) providing an integral annular body comprising a plurality of notches or grooves for mounting one or more of said plurality of elongated portions comprised in a comb-shaped element.

In case of alternative iii) or iv), the method may further comprise: mounting said comb-shaped elements to the circumferential portion of the stator housing by means of welding, soldering, brazing, press fitting or gluing.

According to a fourth aspect, the present invention also provides a method of producing an axial flux electrical machine, comprising the steps of: producing a yokeless stator according to the third aspect; rotatably mounting one or more rotors to the yokeless stator.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 3 is a replica of FIG. 8 of the publication by Bo Zhang mentioned in the background section.

FIG. 6(a) shows a single lamination of FIG. 5. FIG. 6(b) shows a partial stack comprising a plurality of laminations stacked on top of each other. FIG. 6(c) shows a complete laminated stack forming a housing of the stator shown in FIG. 2.

FIG. 9 shows the monolithic annular body and the comb-shaped elements separately, in exploded view, before assembly.

FIG. 10 shows the stator housing comprising the monolithic annular body forming a circumferential portion of the housing, and comprising a plurality of elongated portions extending radially inwards from the annular body, after assembly.

Figure 1:
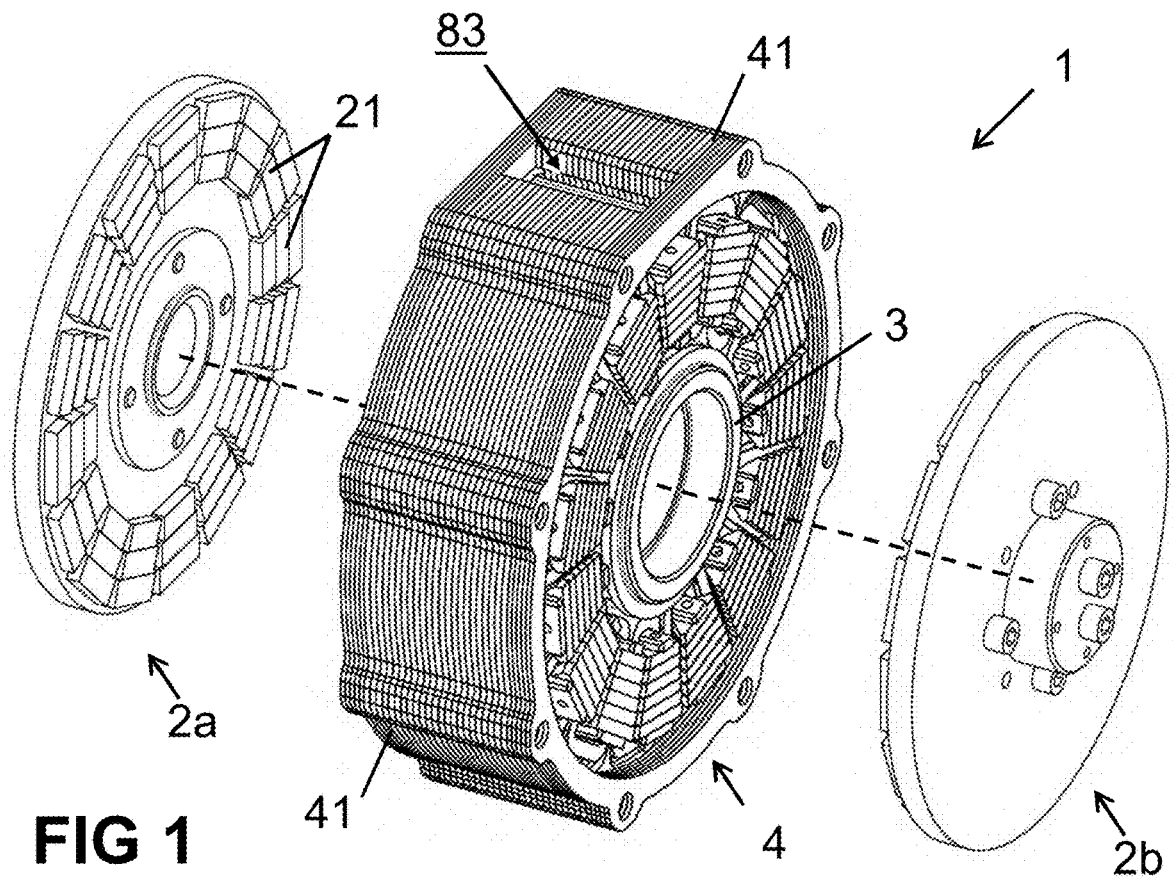
FIG. 1 shows an exploded view of an exemplary axial flux electrical machine according to an embodiment of the present invention, the axial flux machine comprising a yokeless stator (shown in the middle) and two rotors.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, the terms "lamination" and "sheet" are used as synonyms.

In this document, the term "laminated stack" is used to indicate a plurality of laminations (or sheets) stacked on top of each other. The laminations of the stack may be identical or may be different.

In this document, the terms "monolithic" or "integral" are used as synonyms, and mean that a certain piece of material is formed as a single contiguous part (as can be produced e.g. by moulding, extruding, punching, cutting or the like).

In this document the term "discrete stator tooth" is used to indicate a stator tooth (typically made of ferromagnetic material) around which a conductive wire is wound (e.g. a copper wire), referred to herein as "winding" or "concentrated winding". The word "discrete" is sometimes omitted in this document.

The present invention is related to electrical machines, in particular to electrical motors and electrical generators, containing a fixed part (called the stator) and a moving part (called the rotor), and more particularly to machines of the kind having a yokeless stator. While removing the yoke adds advantages in terms of e.g. reducing the weight or increasing the efficiency of the machine, it creates serious challenges/problems related to correct positioning of the stator teeth, mechanical stability (also referred to as "structural integrity") and cooling capacity.

Motors convert electrical energy into mechanical energy (motion), while generators convert mechanical energy (motion) into electrical energy, but in practice, such conversion does not occur with an efficiency of 100.00%, and losses occur, due to "electrical losses" for example caused by electrical resistance of copper windings, "magnetic losses" e.g. in the stator teeth, and "mechanical losses" e.g. from friction in the bearings. These losses create heat that needs to be transferred.

A first specific problem the inventors were confronted with, is that of adequate cooling which is particularly relevant for machines having a relative high power density. The inventors were particularly interested in finding a solution which does not use a cooling liquid that comes close to the stator teeth or to the windings, as that would complicate the machine.

A second specific problem the inventors were confronted with, is to accurately position the stator teeth in the stator housing. Indeed, the absence of a yoke in such machines leaves the stator teeth essentially in a non-determined physical position, while an accurate position of these teeth with respect to each other and to the rotor is beneficial to obtain a high efficiency and a good operation of the machine. The axial position influences the axial air gap between the stator and the rotors, which has an impact on performance.

A third specific problem the inventors were confronted with is to keep the stator teeth in a rigidly fixed position during operation of the machine, despite the enormous mechanical forces exerted thereon, in particular axial forces due to the magnets and tangential forces due to the torque that is being transmitted, and despite the high temperatures to which the stator is subjected.

The present invention addresses at least one, preferably two and most preferably all of these problems.

The inventors came to the idea of providing a yokeless stator 4 for an axial flux electrical machine 1, comprising: a housing 41 comprising a circumferential portion 82, 87; a plurality of discrete stator teeth 5 arranged inside the circumferential portion 82, 87, each discrete stator tooth comprising a ferromagnetic material or a magnetic core and an electrical winding wound around said ferromagnetic material or around said magnetic core. The housing 41 further comprises a plurality of elongated portions 45, 72 extending in a radially inward direction from said circumferential portion 82, 87. The elongated portions 45, 72 have a proximal end which is mechanically connected, e.g. mechanically fixed to the circumferential portion 82, 87 and is in good thermal contact with said circumferential portion (e.g. by being integrally formed with said circumferential portion, or by being welded or soldered or brazed or press fitted thereto), and having a distal portion or distal end which is physically located between the electrical windings of adjacent stator teeth 5. The stator further comprises an electrically isolating filling material 6 filling empty space within said circumferential portion 82, 87, in particular between said plurality of stator teeth 5 and said plurality of elongated portions 45, 72.

The plurality of discrete stator teeth is preferably arranged at equidistant angular positions. The plurality of discrete stator teeth are preferably arranged such that each stator tooth is located between a first and a second coaxial imaginary cylindrical surface, and such that the teeth are located between two imaginary planes perpendicular to an axis of said cylindrical surfaces, tangential to opposite sides of the stator teeth.

The circumferential portion may be a substantially cylindrical portion or an annular portion, having for example a circular cross section, or a polygonal cross section.

The elongated portions 45, 72 may be an integral part of, or may be mechanically firmly connected to the circumferential portion of the housing 41, so as to be capable of withstanding axial and tangential forces of a predefined magnitude (the value of which depends on the power rating of the machine). The elongated portions 45, 72 are also in "good thermal contact" with the circumferential portion of the housing 41, which is understood by the skilled person as providing a relatively low thermal resistance, of the order of magnitude that is typically obtained when two pieces of metal are welded or brazed or soldered or press fitted together.

As will be explained further, the elongated portions 45, 72 have four functions: (1) to define cavities for receiving the discrete stator teeth 5 during assembly, (2) to hold the discrete stator teeth 5 in predefined angular positions during production of the stator 4, (3) to hold the discrete stator teeth 5 in position during actual use of the axial flux machine, and (4) to cool the stator teeth 5 during actual use of the machine by transporting heat from the inside of the stator 4 to the circumferential portion 82, 87 of the housing 41.

Turning now to the figures.

FIG. 1 shows an exploded view of an axial flux electrical machine 1 according to an embodiment of the present invention, comprising a stator 4 (shown in the middle) and two rotors 2a, 2b arranged on opposite sides of the stator 4, but the invention is not limited to this specific embodiment. The rotors 2a, 2b can be mounted to the bearing or bearing assembly 3 in known manners, for example directly or indirectly via a shaft (not shown). In the particular example shown in FIG. 1, the rotors have the form of a disk and have a plurality of permanent magnets 21 fixedly mounted to said disk, but other rotor types may also be used. For example, instead of permanent magnets, the disks may contain electromagnets, or may contain no magnets at all.

The main focus of the present invention, however, is on the structure of the yokeless stator 4, which will be explained in more detail further. As described above, the stator 4 of the present invention also comprises an electrically isolating filling material 6, preferably filling all empty space between the housing 41 and the bearing 3 which is not occupied by the discrete stator teeth 5 or by the elongated portions 45, but the filling material 6 is not shown in the drawings for illustrative purposes.

In fact, it is not required that a bearing 3 is located inside the stator, because bearings could for example also be located outside the stator. Three variants are contemplated in this respect: (1) a stator with a bearing inside the stator, (2) a stator with a central element adapted for holding or for mounting a bearing, (3) a stator without a discrete central element. Only the first variant will be described in more detail herein, but the invention is not limited thereto.

Figure 2:
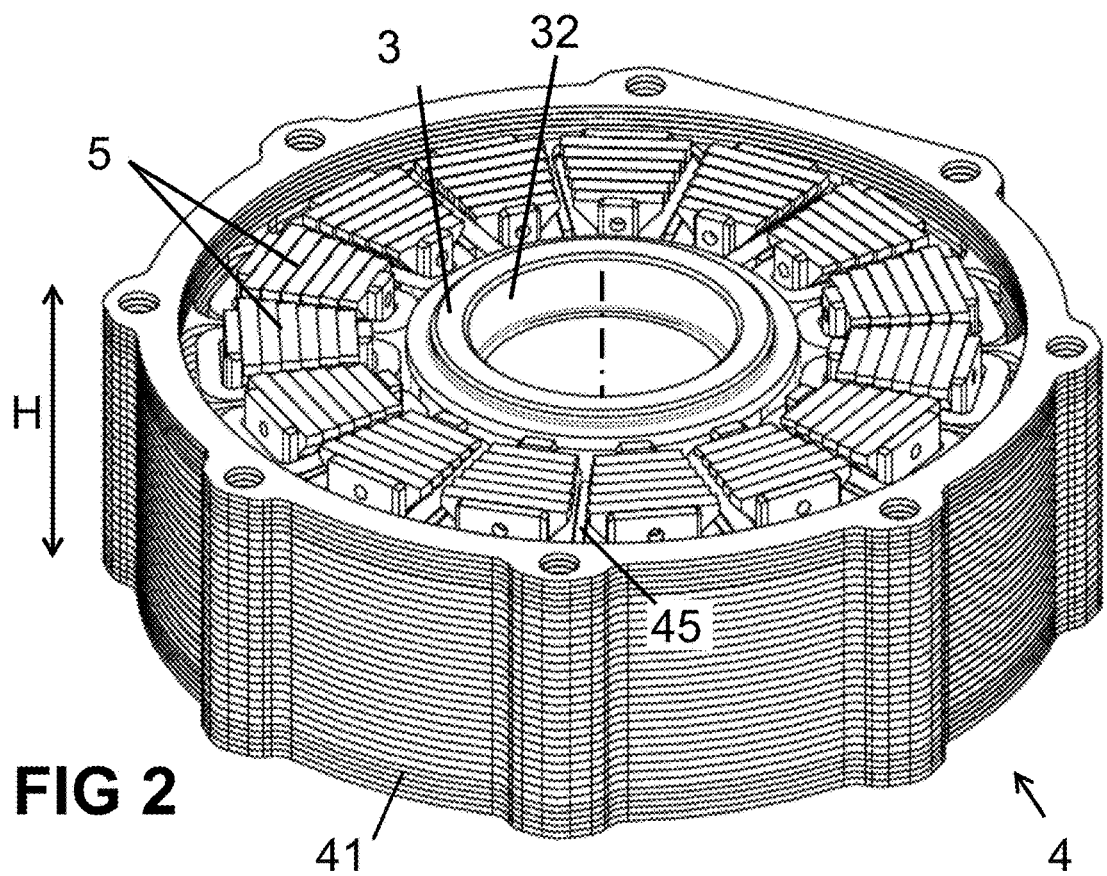
FIG. 2 shows the exemplary stator of FIG. 1 in more detail, as an embodiment of the present invention.

FIG. 2 shows the stator 4 of FIG. 1 in more detail. The stator 4 comprises a housing 41. The housing 41 of FIG. 2 is formed as a laminated stack forming a tubular body. The tubular body comprises a circumferential portion having a substantially cylindrical shape and having a plurality of elongated elements extending from said circumferential portion radially inwards. The housing 41 further comprises a plurality of discrete stator teeth 5 arranged inside said housing 41.

The terms "tubular body" and "cylindrical shape" and "annular shape" should not be understood to mean or suggest that the dimension in the axial direction is larger than a cross-sectional dimension. It is only intended to mean that the structure is open in the axial dimension. The ratio of the axial dimension H and a cross-sectional dimension D of the circumferential portion of the housing of a stator according to the present invention can be larger than 1.0, or, as is usually the case, can be smaller than 1.0, e.g. smaller than 0.5.

The discrete stator teeth 5 are arranged at an angular distance from each other, preferably equidistantly. The housing 41 forms a shell around the plurality of discrete stator teeth 5, and further comprises means for keeping the plurality of discrete stator teeth 5 in place, both during production of the stator 4, but also during normal operation of the machine. These means are the elongated portions 45 extending radially inwards from the circumferential portion. The elongated portions 45 may be integrally formed as part of laminations 43 (or sheets) which are stacked for forming the tubular housing 41 (as will be described in more detail in FIG. 5 to FIG. 8), or may be provided in the form of fingers 72 as part of comb-shaped elements 7, formed separately from the circumferential portion 87 of the housing 41, and fixedly connected thereto (as will be described in more detail in FIG. 9 and FIG. 10), for example by welding, soldering, brazing, press fitting, or any other suitable technique that provides good mechanical and good thermal contact between the circumferential portion and the elongated portions.

In the specific example shown in FIG. 2, the stator 4 comprises a housing 41 having a tubular shape. The tubular shape has a circumferential portion and a plurality of elongated portions extending radially inwards from said circumferential portion. The circumferential portion can have a circular cross section, but a polygonal cross section would also be possible.

In the shown example the stator 4 comprises fifteen discrete stator teeth 5 arranged circumferentially between the circumferential portion of the laminated stack and the bearing 3, but the invention is not limited thereto, and the number of stator teeth 5 can also be smaller than fifteen or higher than fifteen. The number of discrete stator teeth 5 can be even or can be odd.

The bearing 3 can be any suitable type of bearing known in the art.

In the example shown in FIG. 2 the ratio of the axial dimension H and the radial dimension D (outer diameter) of the stator is about 30%, but the invention is not limited thereto and other ratios can also be used.

Figure 3:
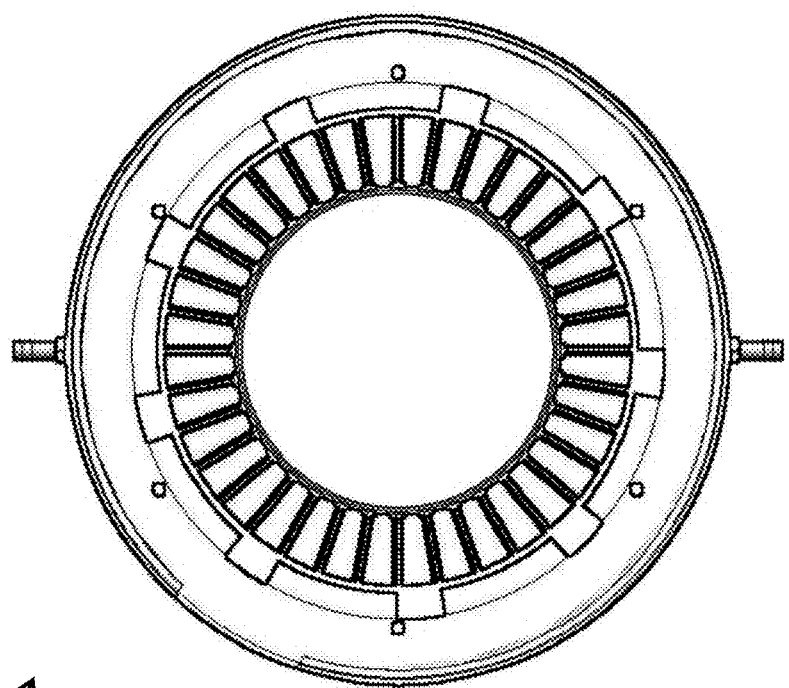
FIG. 3 is an axial flux electrical machine known in the art, having a stator with embedded water cooling.

FIG. 3 shows an axial flux electrical machine known in the art. What is shown is a yokeless stator 200 with embedded water cooling. While water cooling has advantages for some applications, it may be undesired in other applications. The structure of FIG. 2 is further described in the publication by Bo Zhang, mentioned in the background section, in particular FIG. 8 thereof, and will therefore not be described in more detail herein. Suffice it to say that this structure does not have elongated portions extending between the windings of the stator teeth.

Figure 4:
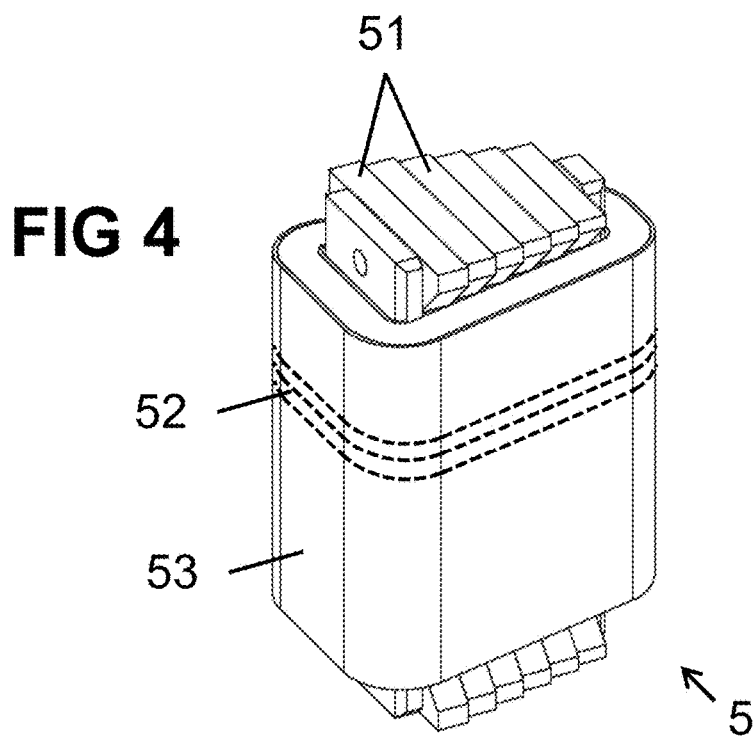
FIG. 4 shows an example of a so called "discrete stator tooth" with a "concentrated winding", known per se in the art, as can be used in embodiments of the present invention.

FIG. 4 shows a discrete stator tooth 5 as can be used in embodiments of the present invention. Discrete stator teeth are known per se in the art, and are therefore only briefly discussed herein.

The discrete stator tooth 5 has a core of a ferromagnetic material, preferably surrounded by a first isolation layer, surrounded by at least one conductive winding or coil (typically a copper winding), preferably surrounded by a second isolation layer. The core is preferably made as a laminated stack comprising a plurality of sheets of ferromagnetic material, e.g. comprising Fe or Ni or FeNi alloys. In the example of FIG. 4, a stator tooth which only eight laminations is shown for illustrative purposes, but in practice the number of stator tooth laminations can be much higher. The use of a laminated core reduces the losses caused by so called "eddy currents". The shape of the laminations is preferably chosen to optimize the performance of the machine in manners known in the art. Despite these measures, there are still electrical losses in the copper windings (due to electrical resistance) and there are still magnetic losses in the ferromagnetic material, resulting in heat (when the machine is in operation), which heat needs to be transported away from the source (inside of the stator 4) to the outside of the stator, to the environment.

According to an important aspect of the present invention, this heat transport can be advantageously achieved or improved by means of a plurality of elongated portions 45, 72, which are preferably located in close vicinity of where the heat is produced. The elongated portions may for example have a distal portion or distal end located between or beyond the discrete stator teeth 5, and have a proximal end formed integrally with or fixedly connected to the circumferential portion of the housing 41 in a manner providing good mechanical contact and good thermal contact with the circumferential portion of the tubular housing 41, e.g. by means of welding, brazing, soldering or press fitting. The elongated portions 45, 72 are preferably made of a non-ferromagnetic material having a relatively high thermal conductivity, such as copper or aluminium or a copper alloy or an aluminium alloy. They are preferably shaped and oriented in a manner that reduces losses due to "eddy currents". Even though individual elongated portions 45, 72 may not provide large mechanical strength or a large heat flow, as a group they do. The mechanical rigidity of the structure is further improved by the filling material 6.

The inventors found two particularly interesting embodiments of such a stator 4, which can be conveniently produced. The first one is based on a laminated stack 82, where each lamination 43 comprises a circumferential portion 44 and a plurality of elongated portions 45, the stack of circumferential portions 44 forming a circumferential body, as will be described in FIG. 5 to FIG. 8. The second one is based on a monolithic body 87 having an annular shape forming the circumferential portion of the housing 41, having a plurality of notches or grooves 49 or the like, to which a plurality of comb-shaped elements 7, each comprising a plurality of elongated portions 72, is mounted. These embodiments will be described in more detail next.

With respect to the orientation of the laminations the following is to be noted. A coordinate system is considered with r the radial direction, fi the circumferential direction and z the axial direction. From a thermal point of view the laminations can be positioned along a 2D-plane with equation fi=constant or z=constant. In both cases an appropriate heat transport is achieved. From an electromagnetic point of view the laminations can be positioned in a plane r=constant or in a plane z=constant. In both cases substantial eddy currents are avoided. Consequently, in order to achieve both effects simultaneously, the solution with z=constant is preferable.

First Preferred Embodiment

Figure 5:
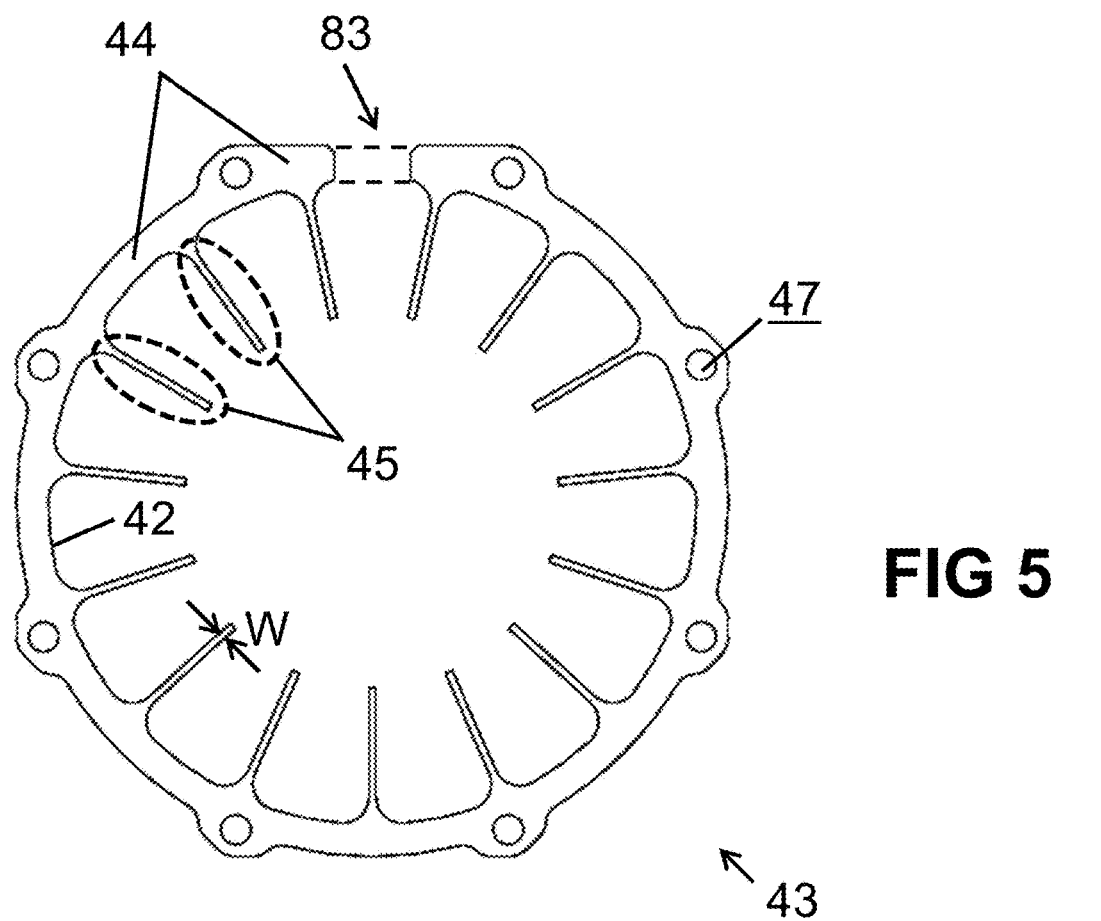
FIG. 5 shows an example of a lamination as can be used in embodiments of the present invention. The lamination has a circumferential portion and a plurality of elongated portions extending radially inwards.

FIG. 5 shows an example of a lamination 43 or sheet as can be used in embodiments according to the present invention, and FIGS. 6(*a*) to 6(*c*) illustrate how such laminations 43 can be stacked on top of each other to form a laminated stack 82 forming the stator housing 41 having a circumferential portion and elongated elements 45 extending radially inwards therefrom. The laminations 43 have a shape comprising a circumferential portion 44 and a plurality of elongated portions 45 extending radially inward from said circumferential portion 44.

Preferably the laminations 43 are made of a non-ferromagnetic metal or metal alloy, such as copper or aluminium or a copper alloy or an aluminium alloy, because non-ferromagnetic metal or alloys are materials having a relatively low magnetic permeability and a relatively high thermal conductance. This provides low magnetic losses and high heat transport.

Such laminations 43 can be produced for example by cutting or stamping or punching metal sheets, e.g. by laser cutting or plasma cutting, but other suitable techniques may also be used. The metal sheets typically have a thickness of about 1.5 mm or 2.0 mm or 2.5 mm, but the invention is not limited thereto, and metal sheets having a thickness smaller than 1.5 mm or higher than 2.5 mm can also be used, for example any thickness in the range from 1.0 mm to 6.0 mm.

The elongated portions 45 shown in the example of FIG. 5 have a rectangular shape with a predefined length "Lx" (see FIG. 7) and predefined constant width "W", but the present invention is not limited thereto, and other shapes can also be used, for example a triangular shape or a trapezoidal shape or even a zig-zag shape, or any other suitable shape. In order to avoid mechanical stress concentrations, and in order to closely follow the contour of the windings 52 on the discrete stator teeth 5 in order to keep the thermal resistance between the windings 52 and the elongated portions 45 as low as possible, the proximal end of the elongated portions (i.e. the end near the circumferential portion 44) preferably does not have sharp 90° edges, but preferably is rounded or tapered or conical, as shown for example in FIG. 5. Between its proximal end and its distal end, the elongated portions 45 preferably have a shape which is substantially complementary to that of the windings 52. A small clearance may be provided between the windings 52 of the stator teeth 5 and the elongated portions 45. This clearance is preferably smaller than 3.0 mm, e.g. smaller than 2.0 mm, e.g. about 1.0 mm, depending on the dimensions of the stator teeth 5 with concentrated windings 52. Choosing a smaller clearance reduces the thermal resistance and thus improves thermal transport, but makes the assembly of the stator 4 slightly more difficult.

Still referring to FIG. 5, the circumferential portion 44 of the laminations 43 may have the shape of a closed circle or a closed polygon and may optionally have one or more openings or gap 83. This optional gap 83 may be present in some of the laminations 43 of the laminated stack 41, but preferably not in all laminations. When present, the opening or gap 83 can for example be used for facilitating electrical connection to the stator windings 52, but of course the present invention is not limited to this way of connection, and any other suitable way for connecting these windings can also be used.

The circumferential portion 44 may further comprise a plurality of through holes 47, which can be used during production for aligning the laminations 43 (e.g. in the XY-plane) and/or for clamping the stack 41 (e.g. in the Z-direction) when being filled with filling material 6 and/or during actual use of the stator 4 for exerting an axial clamping force on the laminations 43. It is possible for example to insert a threaded steel rod in these holes 47 and to clamp them together by means of nuts (not shown) or in any other suitable way known in the art.

While FIG. 5 shows a lamination made of a single piece, it is also possible to provide two or more "lamination segments" which can be arranged to form substantially the same object as shown in FIG. 5 and each comprising a circumferential portion (e.g. two portions spanning an arc of about 180° or three portions spanning an arc of about 120° or four portions spanning an arc of about 90°) and having at least one elongated portion 45 directed radially inwards. Each of these portions may have at least two through holes 47, although that is not absolutely necessary. As will be understood from FIGS. 6(a) to 6(c), these lamination segments can be stacked on top of each other and held together by suitable means. It is an advantage of providing the lamination 43 as a "single piece" in that it provides an increased mechanical strength and requires less handling during manufacturing. It is an advantage of providing the lamination 43 in "two or more complementary pieces" in that it allows producing the lamination with less material waste. This is especially important for axial flux machines having relatively large diameters.

The circumferential portion 44 of the laminations 43 may comprise additional holes (not shown) for forming channels in the stack, or for receiving pipes or conduits (oriented in the axial direction), which may be used for allowing cooling with a fluid such as for example a water jacket. Additionally the circumferential portions 44 might have radially outward extensions (not shown) for acting as cooling fins to the environment.

Figure 6A:
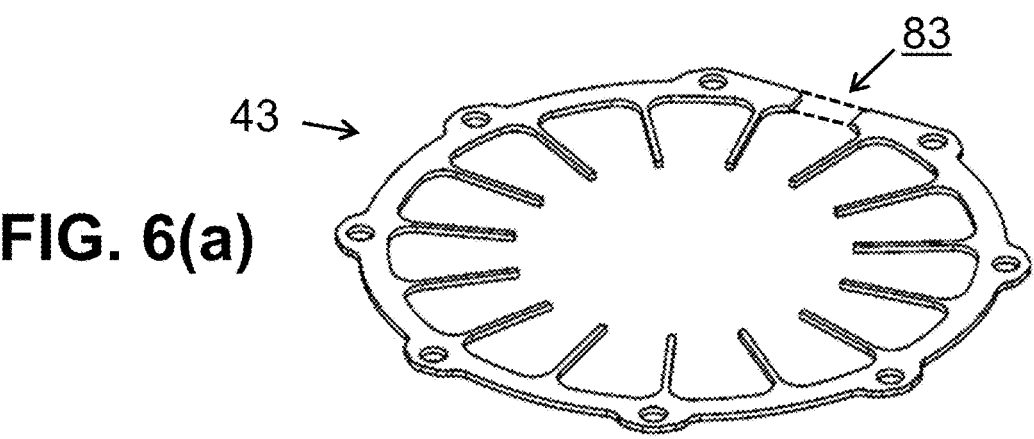
FIGS. 6(a) to 6(c) are an example showing how the stator of FIG. 2 can be built as a laminated stack.
Figure 6B:
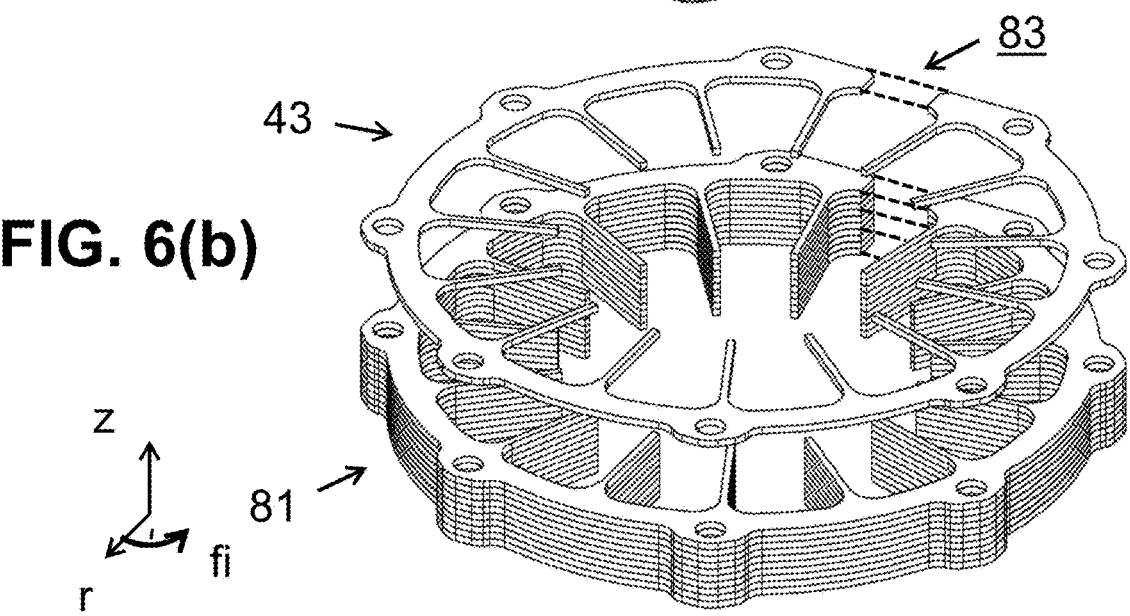
Figure 6C:
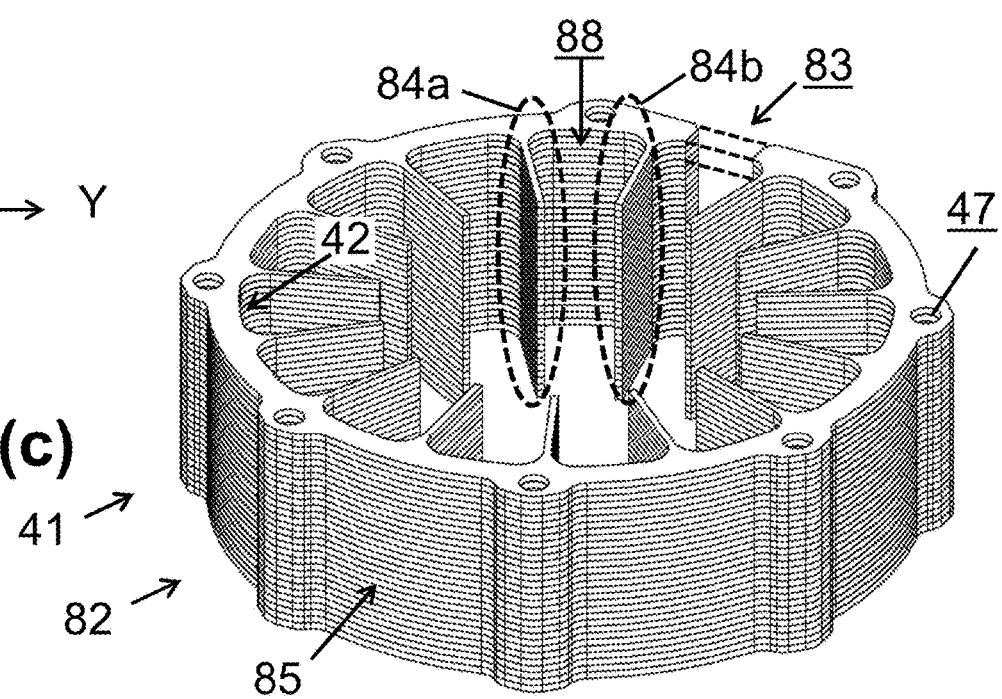

FIG. 6(a) shows a single lamination 43 of FIG. 5 in perspective view. FIG. 6(b) shows how a plurality of identical laminations 43 can be stacked on top of each other, to form a partial stack 81. FIG. 6(c) shows an example of a laminated stack 82 consisting of a plurality of laminations 43 stacked on top of each other for forming the housing 41 of the stator 4.

In the example of FIGS. 6(a) to 6(c) all laminations 43 are of the same type and they all have an opening 83, all openings being located on top of each other, but the present invention is not limited thereto, and openings 83 of different laminations may be provided at different angular locations (not shown), which can easily be obtained during assembly by simply rotating the laminations before or while stacking them.

As can be seen, the stacked elongated portions 45 form a kind of "internal wall" or "internal grid" or "internal lattice", depending on whether or not the elongated portions 45 are spaced apart, jointly referred to herein as "internal walls". These internal walls or grids or lattices 84 facilitate easy and accurate positioning of the stator teeth 5 during production of the stator 4. Due to their being made of a stack of laminations, these "internal walls" 84 only cause minimal losses (by preventing or reducing large eddy currents). Since the elongated portions 45 are integrally formed with the circumferential portions 44, they also provide excellent mechanical and excellent thermal connection to the circumferential portions 44, allowing the housing 41 to withstand relatively large axial and tangential forces and allowing efficient heat transfer from an inside of the housing 41 where the heat is produced, to the circumferential portions 44, and to the outside of the housing 41, where the heat is removed.

In practice the laminations 43 do not all have an opening 83, but some of them may. Preferably at least two laminations 43 at the bottom of the stack 82 and preferably at least two laminations 43 at the top of the stack are closed, i.e. do not have an opening 83. In the example of FIG. 1, five laminations at the bottom (left of FIG. 1) and five laminations of at the top (right of FIG. 1) are closed.

Figure 7:
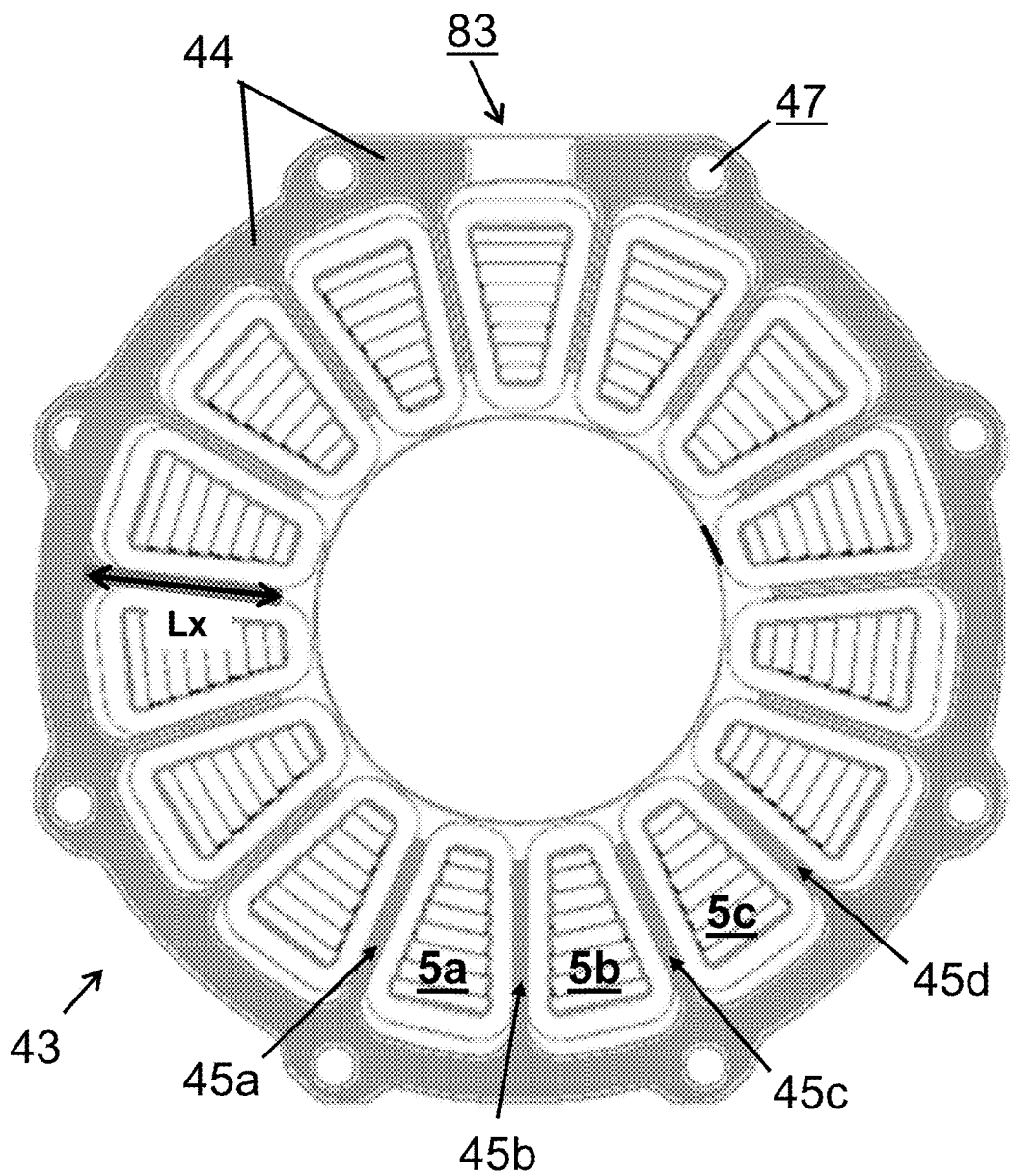
FIG. 7 is a cross sectional view of the stator of FIG. 2, in a plane perpendicular to the rotor axis. It illustrates an example of the relative position and size of one lamination and a plurality of discrete stator teeth.

FIG. 7 shows an example of the relative position of the discrete stator teeth 5 (see FIG. 4) and the lamination(s) 43 of FIG. 5 and FIGS. 6(a) to 6(c), when producing a stator 4. As described above, the stator teeth 5 can be simply inserted in the cavities 88 (see FIG. 6c) formed between two "internal walls" 84a, 84b and between the inner surface 42 of the circumferential portion of the housing, and an outer surface of the bearing 3 (not shown in FIG. 6c). Alternatively the bearing or bearing assembly 3 can be added after insertion of the discrete stator teeth 5 in said cavities 88.

In general, the larger the surface area of the "internal walls" 84 which are located in close vicinity or immediate vicinity of the concentrated windings 52 on the stator teeth, and thus in good thermal contact therewith, the more efficient the heat transfer (i.e. the more heat is transported for a given temperature difference) and thus the lower the temperature inside the stator 4.

Not only the length Lx of the elongated portion 45, but also its shape and dimensions (e.g. the width W in FIG. 5 and its thickness) have an influence on the heat transfer. As a rule of thumb, the larger the width W for a given thickness of the elongated portions 45, the larger the heat transfer capacity.

Another important aspect is the distance between the elongated portions 45 and the electrical windings 52, where the heat has to pass through the filling material 6. This distance is preferably as small as possible. Preferably the shape of the elongated portions 45 is chosen complementary to the outer shape of the concentrated winding 52 of the stator teeth 5.

As described above, all remaining empty space inside the stator 4 between the inner surface 42 (see FIG. 6c) of the circumferential portion of the housing 41 and the outer surface of the bearing (or bearing assembly) 3, which is not occupied e.g. by the elongated portions 45 and the stator teeth 5, will be filled with an electrically insulating, but preferably thermally highly conductive filling material 6, such as for example an epoxy. It is advantageous that no air bubbles remain inside the filling material 6 as such bubbles would increase the thermal resistance and thus reduce the effectiveness of the cooling.

In the embodiment of FIG. 6(c) all laminations 43 are identical and have a number "Nep" of elongated portions which is equal to the number "Nst" of stator teeth, thus Nep=Nst, which allows providing one elongated portion 45 between each pair of adjacent stator teeth 5 for each layer of the stack. In this case the laminations 43, or at least the elongated portions 45 thereof, of two laminations 43 stacked on top of each other should be electrically isolated from each other, e.g. by means of an insulating coating and/or an insulating epoxy and/or an insulating glue between them, in order to reduce "eddy currents". It is noted in this respect that lamination of the circumferential portion of the housing 41 itself is not absolutely required, because "eddy currents" are relatively small at the circumference of the housing, but is very important between the stator teeth.

Figure 8A:
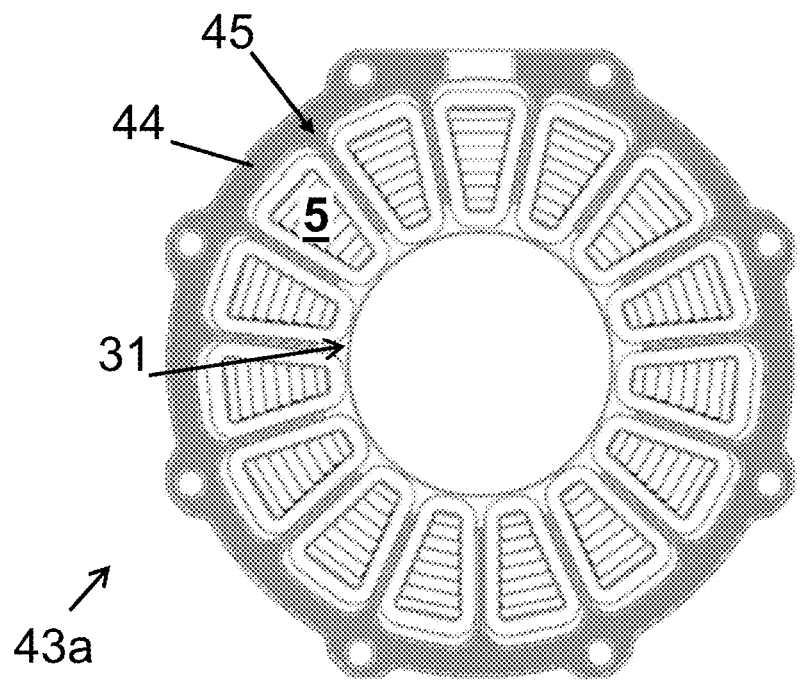
FIG. 8(a) and FIG. 8(b) show an example of two different laminations as can be used together in embodiments of a stator according to the present invention. The lamination of FIG. 8(a) is an integral lamination having a circumferential portion and a plurality of elongated portions extending radially inwards. The lamination of FIG. 8(b) has a circumferential portion, but no elongated portions.
Figure 8B:
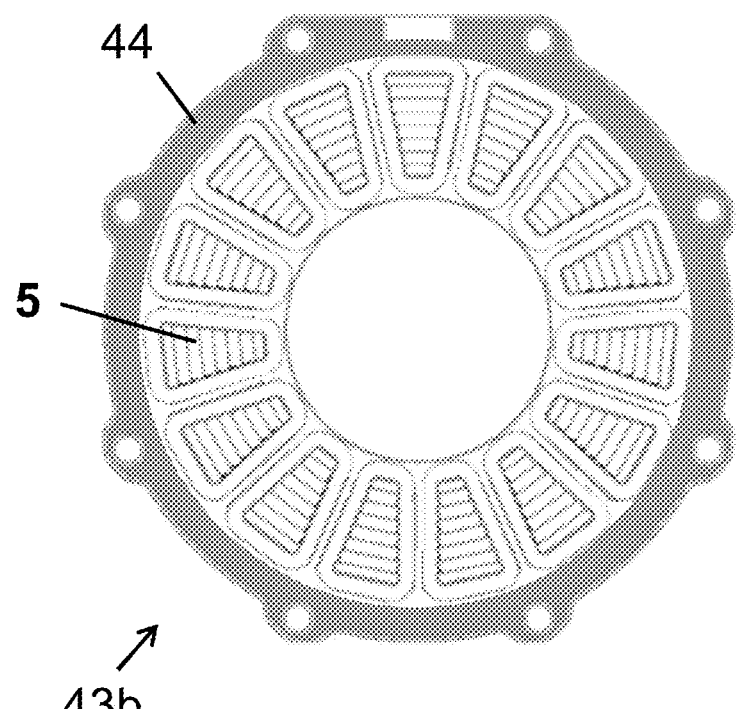

Reference is now made to FIG. 8. In another embodiment of a stator according to the present invention, the stator 4 may comprise at least two different types of laminations, for example a first type 43a, shown in FIG. 8(a), and a second type of lamination 43b, shown in FIG. 8(b). The first type of lamination has elongated portions 45, while the second type of lamination 43b does not. The first type 43a may for example occupy even numbered layers of the laminated stack and the second type may for example occupy odd numbered layers of the stack, or vice versa. This is another way of avoiding electrical contact between the elongated portions 45 of adjacent laminations in order to reduce eddy currents, namely by providing an axial spacing between them.

Figure 8C:
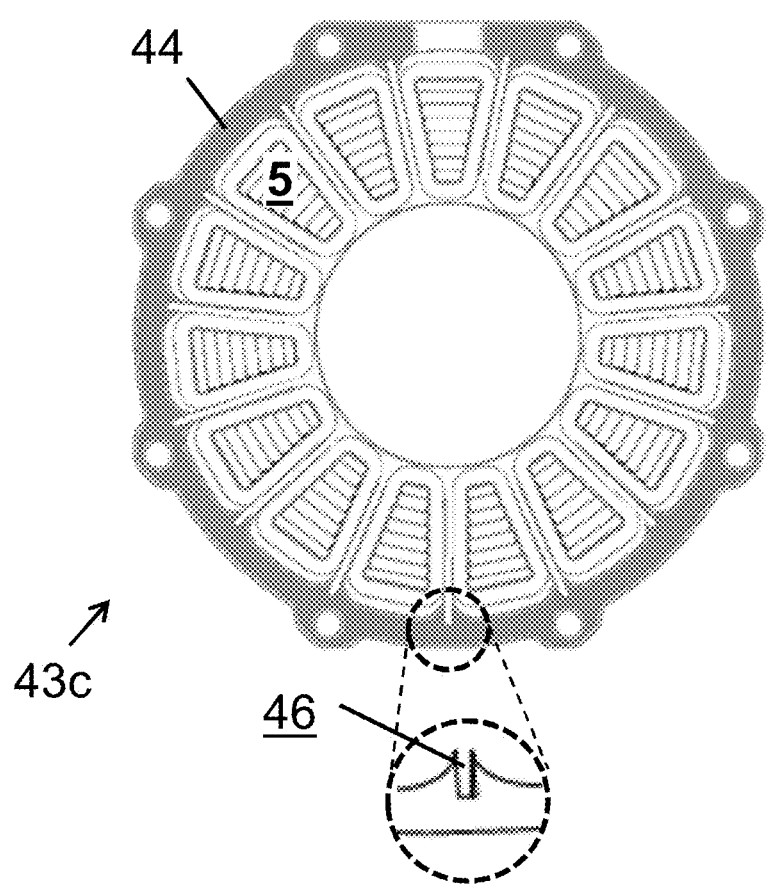
FIG. 8(c) shows an example of a type of lamination as can be used in an embodiment of a stator according to the present invention, in combination with comb-shaped elements as shown e.g.
Figure 9:
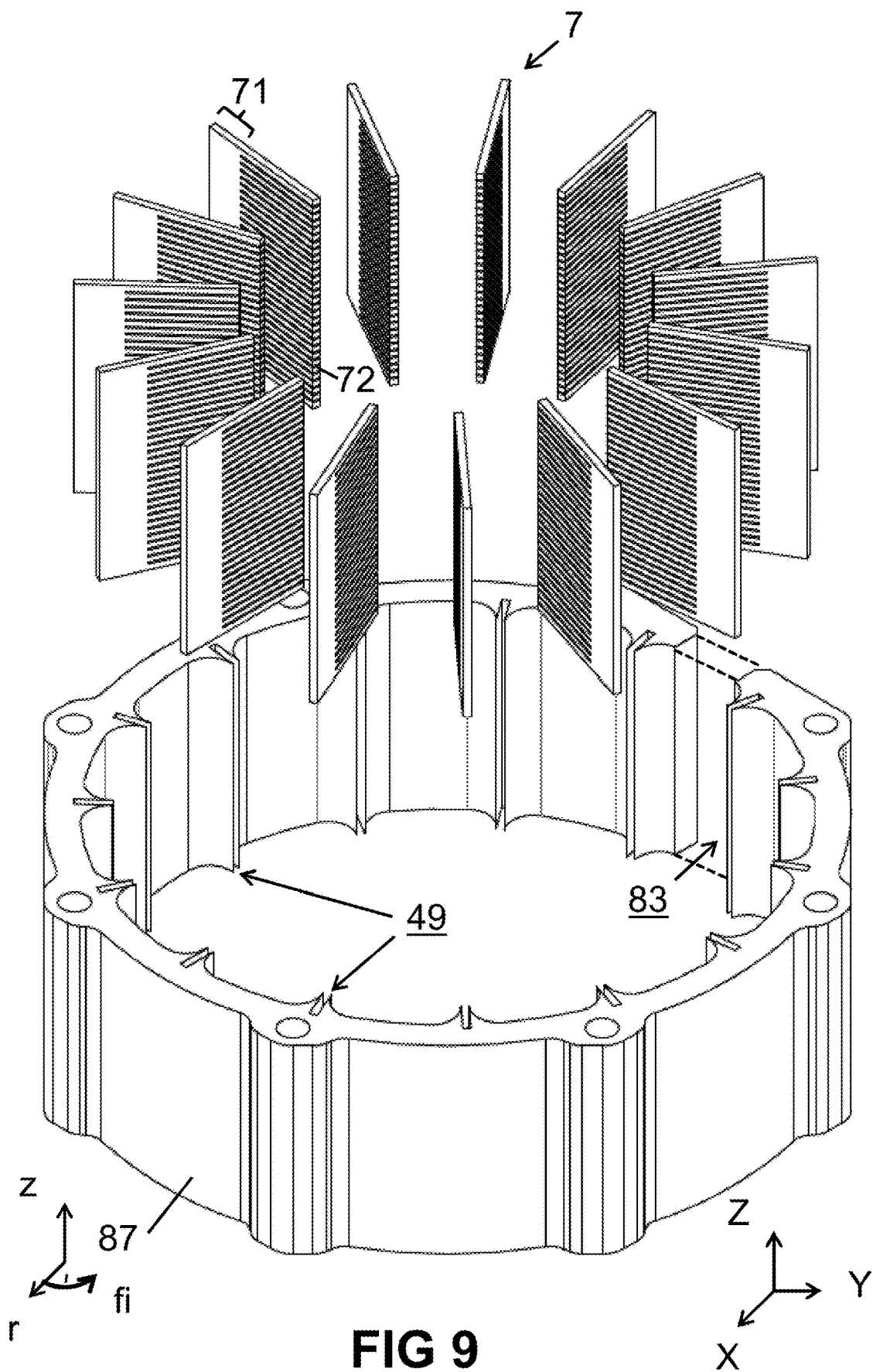
in FIG. 9, and optionally in combination with laminations of FIG. 8(b).

FIG. 8(c) shows an example of a type of lamination 43c comprising a plurality of notches 46, where corresponding notches of different laminations 43c stacked on top of each other are adapted for receiving comb-shaped elements 7 like those shown e.g. in FIG. 9. The comb-shaped elements 7 can for example be glued or welded or brazed or soldered or press fitted in the notches or grooves 46. In a particular example the notches 46 may have a conical shape or the shape of a dove tail and the comb-shaped elements 7 may be slid in axial direction into the stack and then fixedly mounted thereto. The tubular housing 41 may comprise mainly laminations 43c of the type shown in FIG. 8(c) or a combination of laminations 43c (see FIG. 8c) alternated with laminations 43b (see FIG. 8b). Similar as described above, the laminations 43c may comprise an opening 83, but preferably at least a predefined number of laminations (e.g. at least two at the bottom of the stack and at least two at the top of the stack) do not comprise such a gap 83, but have a closed circumferential portion 44.

In another embodiment (not shown), at least some of the laminations 43 have a number "Nep" of elongated portions 45 equal to only half the number "Nst" of stator teeth 5, thus Nep=Nst/2. This configuration may be interesting if the number of stator teeth is an integer multiple of two. In this case the laminations 43 are preferably arranged such that the elongated portions 45 of even numbered laminations and odd numbered laminations are not located directly on top of each other. This is another way of providing axial spacing between the elongated portions 45 for avoiding direct contact.

Of course, it would in principle also be possible to provide laminations 43 where the number of elongated portions "Nep" is only ⅓th the number "Nst" of stator teeth, thus Nep=Nst/3, which allows creating an even larger axial distance between elongated portions 45 of different layers. This configuration may be interesting if the number of stator teeth is an integer multiple of three and may be suitable for lower power density machines, but such a stator has a lower mechanical stability and provides a less efficient heat transfer as compared to the example described above, because the total number of elongated portions 45 is reduced by a factor three.

Second Preferred Embodiment

Figure 10:
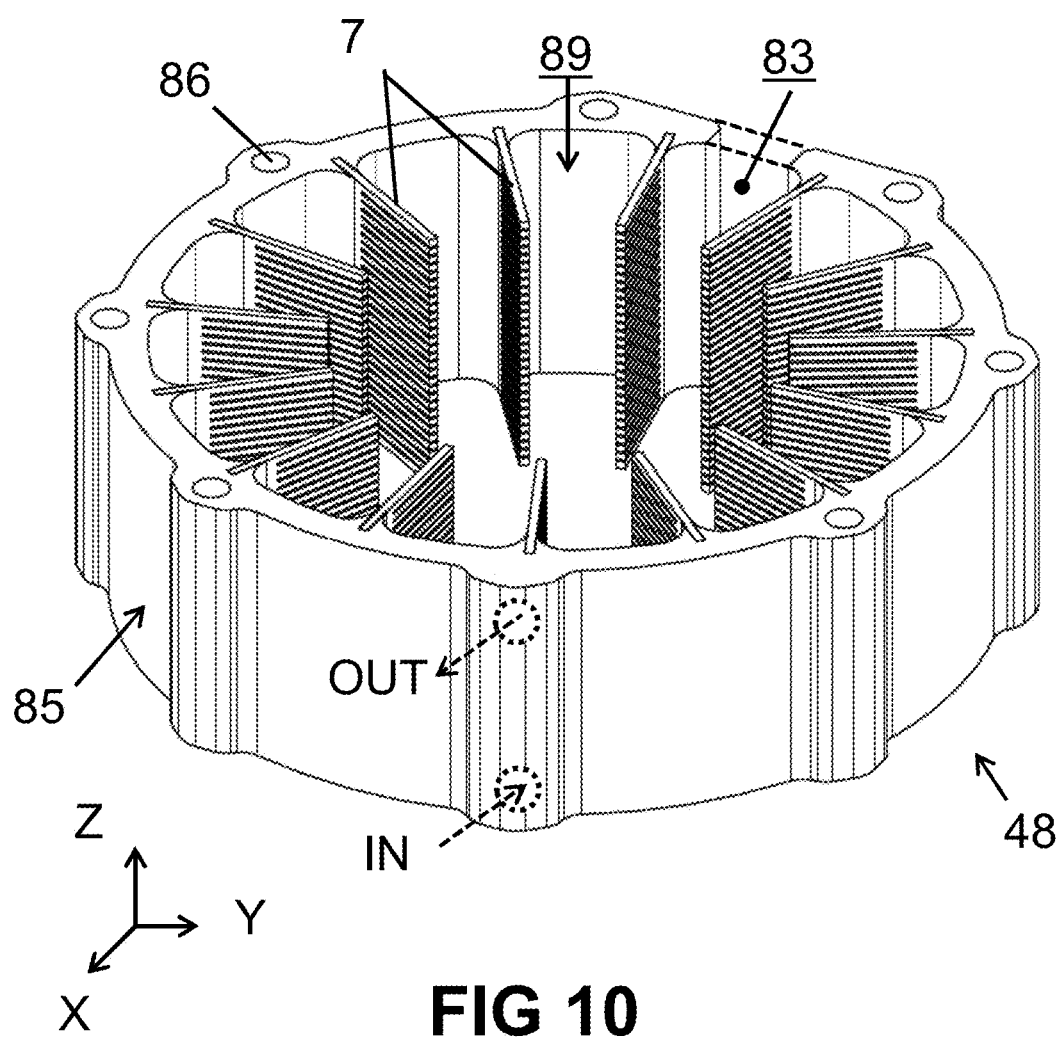
FIG. 10 shows an example of another embodiment of a stator housing for forming a yokeless stator according to the present invention. The stator housing comprises a single monolithic body having an annular shape and having a plurality of grooves on an inner surface thereof, adapted for receiving a plurality of comb-shaped elements each comprising a plurality of elongated portions.

FIG. 9 and FIG. 10 show another embodiment of a stator 4 according to the present invention in exploded view (FIG. 9) and in assembled form (FIG. 10). The main difference between the embodiment of FIG. 9 and FIG. 10 on the one hand, and the embodiments of FIG. 5 to FIG. 8 on the other hand, is that in the embodiment of FIG. 9 and FIG. 10, the stator 4 comprises a monolithic body 87 having an annular shape forming a circumferential portion of the housing 41. The circumferential portion has a plurality of grooves 49 or slits or the like on an inner surface thereof for mounting a plurality of comb-shaped elements 7, which are separately formed, but mounted to the circumferential portion for example by welding, pressing, soldering or brazing.

In this embodiment the circumferential portion of the housing 41 is not laminated, but, as mentioned above, that is not of a concern, because the eddy currents are small at the circumferential location. In contrast, the comb-shaped elements 7 have a shape comprising a first part 71 adapted for being received in the grooves or slits 49, and a plurality of fingers 72 extending orthogonally to the first part 71. These fingers 72 have the same function as the elongated portions 45 described above. The comb-shape ensures that the fingers 72 do not contact each other at their distal end, hence the formation of an electrically conductive loop is prevented, and losses due to eddy currents are reduced.

Also in this embodiment the comb-shaped elements have four functions: (1) to define cavities 89 for receiving the discrete stator teeth 5 during assembly, (2) to hold the discrete stator teeth 5 in position during production of the stator 4, (3) to hold the discrete stator teeth 5 in position during actual use of the axial flux machine, and (4) to cool the stator teeth 5 during actual use of the machine by transporting heat from the inside of the stator 4 to the circumference.

The comb-shaped elements 7 are fixedly mounted to the circumferential portion 87 in any known manner. For example, the comb-shaped elements 7 may have at least two cylindrical protrusions to be inserted in corresponding openings made in the circumferential portion (not shown), which protrusions are then deformed like rivets. In another embodiment the comb-shaped elements 7 are press fitted. The comb-shaped elements 7 and the grooves 49 may have a dovetail-shape, in which case the comb-shaped elements 7 can be inserted in the grooves 49 by axial insertion. In another embodiment the comb-shaped elements 7 are planar elements, in which case the comb-shaped elements 7 can be radially inserted in the grooves 49. Preferably the comb shaped elements 7 have a shape complementary to the shape of the grooves 49, for allowing good mechanical and good thermal contact. Welding or brazing or soldering further improves such mechanical and thermal contact between the circumferential portion 87 and the comb-shaped elements 7 and allows efficient heat transport. The comb-shaped elements 7 are preferably made of a non-ferromagnetic material or alloy, e.g. aluminium or copper or an aluminium alloy or a copper alloy.

The monolithic annular body 87 shown in FIG. 9 has a relatively large opening 83, but, as described above, that is not required and this opening 83 may be omitted for the same reasons as described above.

Although not absolutely required, the monolithic annular body 87 may further comprise a plurality of channels 86 for allowing the annular body 87 to be cooled with a cooling liquid, e.g. water. The inlets and outlets of these channels may be provided on the top and bottom of the annular body (see left of FIG. 10) or on an outer surface 85 of the annular body (as shown in middle of FIG. 10).

Figure 11:
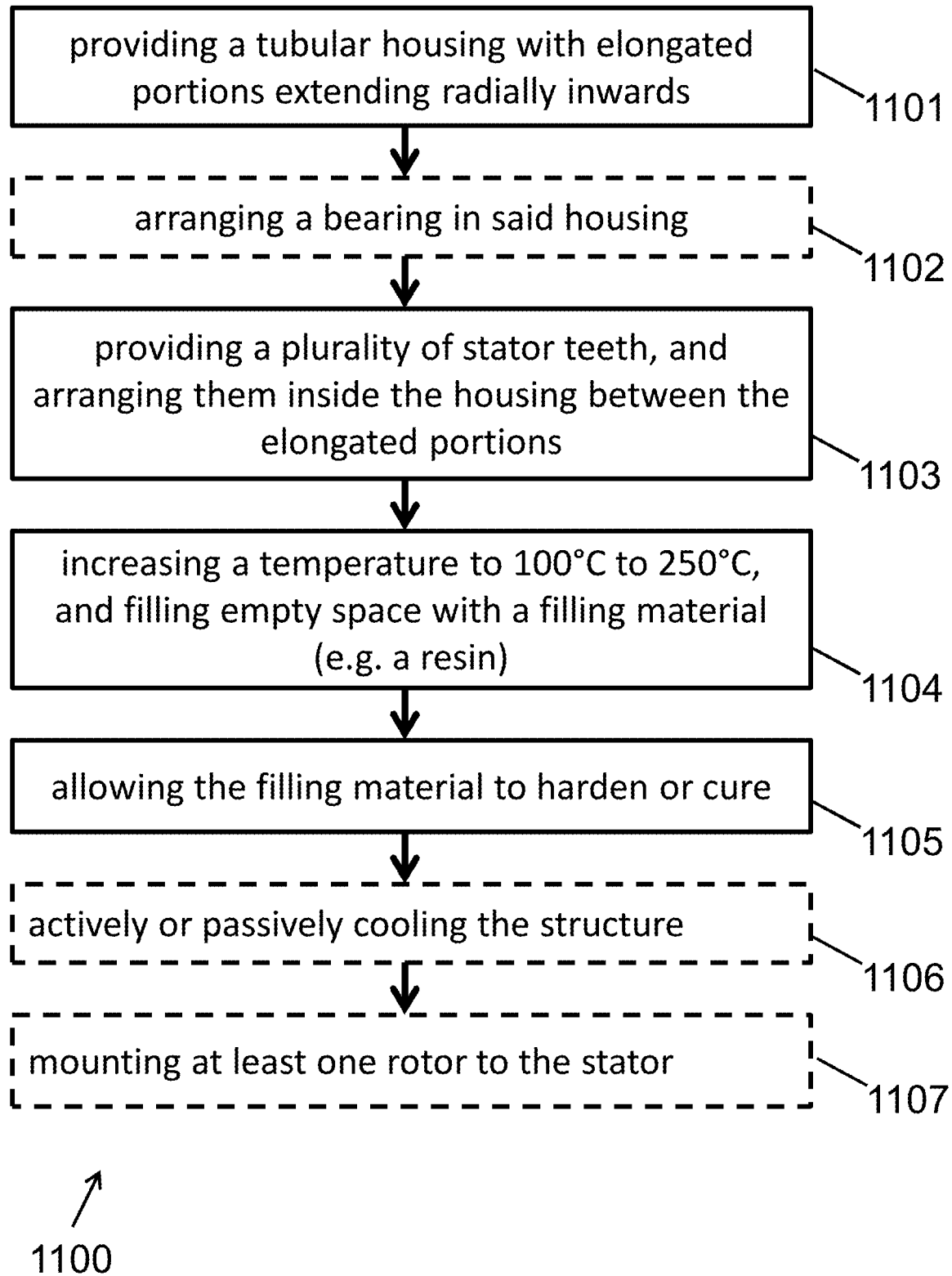
FIG. 11 shows an example of a method of manufacturing a yokeless stator for an axial flux machine according to an embodiment of the present invention. The optional steps show further steps for manufacturing an axial flux electrical machine comprising such a yokeless stator.
Figure 12A:
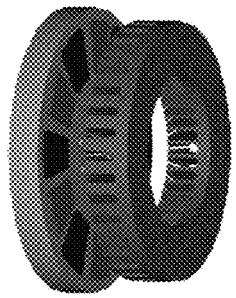
FIGS. 12(a) to 12(d) are a replica of FIG. 1.3 from the thesis by A. Parvainen, known in the art.
Figure 12B:
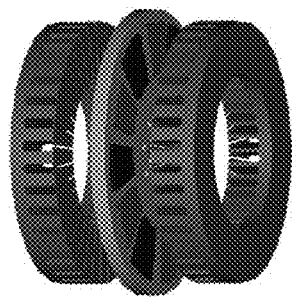
Figure 12C:
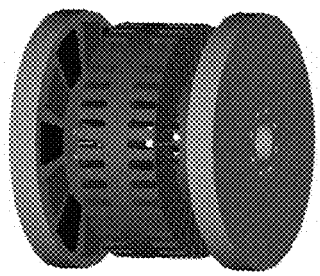
Figure 12D:
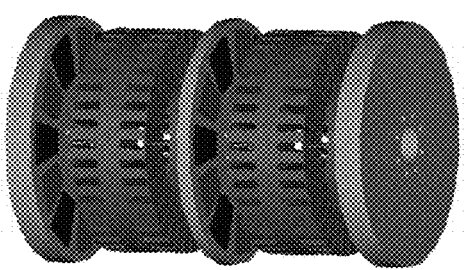
Figure 13A:
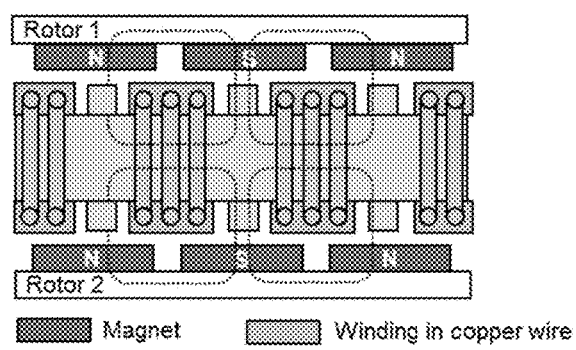
FIG. 13(a) shows a Torus machine with North pole on first rotor facing north pole on second rotor.
Figure 13B:
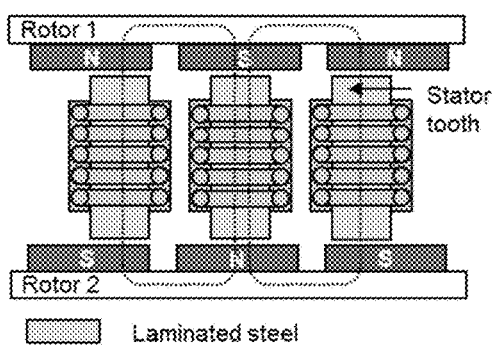
FIG. 13(b) shows a YASA machine with North pole on first rotor facing south pole on second rotor, known in the art.
Figure 14:
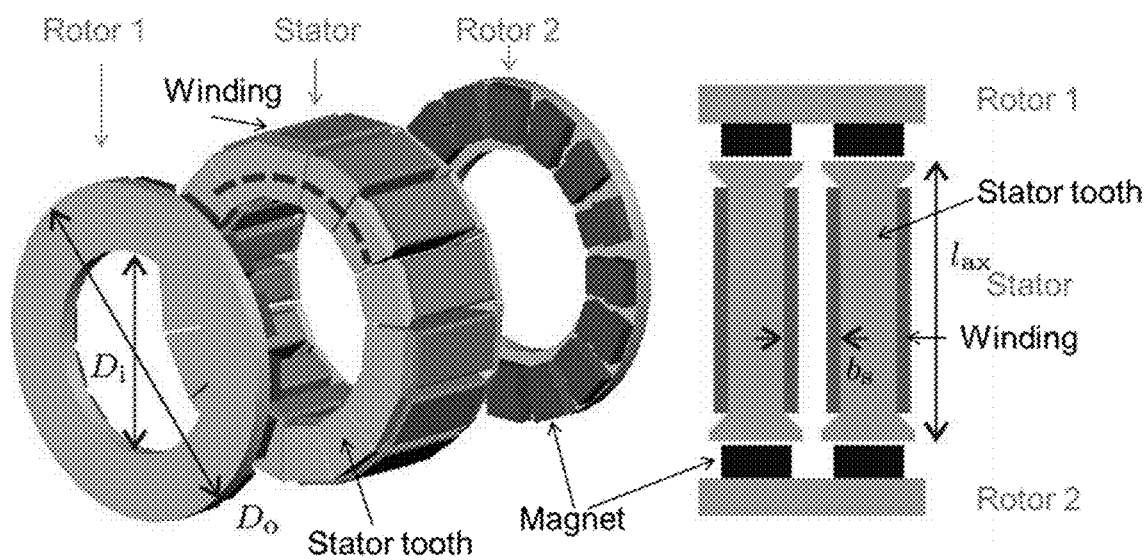
FIG. 14 shows a schematic configuration of the YASA type machine with slots as described by J. Gieras et al, known in the art.

FIG. 11 shows an example of a method of manufacturing a stator 4 for an axial flux machine 1 according to the present invention. The method 1100 comprises:
providing 1101 a housing 41, 48 comprising a circumferential portion and a plurality of elongated portions 45, 72 extending from said circumferential portion in a radially inward direction; (see example of FIG. 6(c) and FIG. 10), providing 1103 a plurality of discrete stator teeth 5 and arranging them in said plurality of cavities 88, 89, each discrete stator tooth 5 comprising a ferromagnetic material 51 or magnetic core and a conductive winding 52 wound around said ferromagnetic material or ferromagnetic core; increasing 1104 the temperature of the arrangement to a temperature in the range from 50° C. to 250° C., or for example from 100° C. to 250° C. for thermally expanding the structure, and while maintaining this temperature, filling any remaining empty space within said circumferential portion 82, 87 in particular between said plurality of discrete stator teeth 5 and said elongated portions 45, 72 with an electrically isolating filling material such as e.g. epoxy; allowing 1105 the filling material 6 to harden and/or cure.

The method may further comprise a step 1102 between step 1101 and step 1103 or between step 1103 and step 1104 of arranging 1102 a central element or a bearing inside said housing.

The method may further comprise step 1106 following step 1105 of actively or passively cooling the stator 4, thereby contracting the stator (4) and pre-tensioning the housing 41, 48. This pre-tensioning is caused by the difference in thermal expansion coefficient between the circumferential portion of the housing 41, 48 (e.g. Al or Al-alloy) and the thermal expansion coefficient of the magnetic cores (e.g. containing Fe or Ni), the windings (e.g. copper) and the resin.

FIG. 11 also shows a further step for producing an axial flux electrical machine 1 (an example of which is shown in FIG. 1 in exploded view), namely step 1107 of mounting at least one, for example two rotors 2a, 2b to said stator 4.

Other embodiments are also possible, for example embodiments (not shown) comprising a plurality of laminations 43 like the one shown in FIG. 8(b), but having a plurality of notches on an inside of the circumferential portion 44, are stacked on top of each other, the notches forming grooves in axial direction on the inner surface of the circumferential portion, in which grooves comb-shaped elements 7 like those shown in FIG. 9 are mounted, for example by welding, soldering, brazing or press fitting, resulting in an assembly like the one shown in FIG. 10, but comprising a circumferential portion in the form of a laminated stack rather than on a monolithic annular body 87.

For completeness it is mentioned that, once the stator 4 is produced and filled with an electrically isolating filling material 6, it can of course be cooled on its outside surface 85 in any known manner, e.g. by passive air cooling (e.g. by being exposed in the open air), or by active air cooling (e.g. by blowing air over the stator), or by active water cooling. It is noted that cooling the stator 4 on its outside surface is fundamentally different from the solution provided in FIG. 3, where the machine is cooled on the inside with liquid.

The invention claimed is:

1. A yokeless stator for an axial flux electrical machine, comprising:
    a housing comprising a circumferential portion;
    a plurality of discrete stator teeth arranged within the circumferential portion, each discrete stator tooth comprising a ferromagnetic material and an electrical winding wound around said ferromagnetic material;
    the housing further comprising a plurality of elongated portions extending in a radially inward direction from said circumferential portion,
    the elongated portions having a proximal end being mechanically connected to the circumferential portion and being in thermal contact with said circumferential portion, and having a distal portion or distal end being physically located between the electrical windings of adjacent stator teeth;
    an electrically isolating filling material filling empty space within said circumferential portion between said plurality of stator teeth and said plurality of elongated portions,
    wherein said circumferential portion of said housing is made of a first non-ferromagnetic material and said elongated portions are made of a second non-ferromagnetic material,
    wherein said housing comprises a laminated structure, said laminated structure comprising at least some of said plurality of inwardly directed elongated portions, and
    wherein
        the yokeless stator further comprises a central element arranged inside said housing,
        the plurality of discrete stator teeth are arranged in a space between the circumferential portion and the central element;
        the elongated portions extend in a radially inward direction from said circumferential portion towards the central element;
        an electrically isolating filling material fills empty space between said circumferential portion and the central element and said plurality of stator teeth and said plurality of elongated portions.

2. The stator according to claim 1, wherein said first non-ferromagnetic material and said second non-ferromagnetic material are identical.

3. The stator according to claim 1, wherein said laminated structure comprises a plurality of laminations stacked on top of each other, said laminations having a shape comprising at least a part of said circumferential portion.

4. The stator according to claim 3, wherein said at least some of said laminations comprise two or more lamination segments, each having said part of said circumferential portion spanning an arc smaller than 360°.

5. The stator according to claim 3, wherein said at least some of said laminations further comprise said part of said plurality of radially inwardly directed elongated portions formed integrally with said circumferential portion.

6. The stator according to claim 3, wherein all laminations are identical, or wherein said laminations comprise a first type of laminations that comprise a plurality of radially inwardly directed elongated portions formed integrally with the circumferential portion, and a second type of laminations that comprise only a circumferential portion but no radially inwardly directed elongated portions.

7. The stator according to claim 1, wherein said stator housing comprises a monolithic annular body as the circumferential portion.

8. The stator according to claim 1, wherein said laminated structure comprises a plurality of elongated plates stacked on top of each other forming at least some of said plurality of inwardly directed elongated portions.

9. The stator according to claim 1, wherein said filling material is a resin or comprises a resin and fibrous material.

10. An axial flux electrical machine comprising the yokeless stator according to claim 1 and at least one rotor rotatably mounted to said stator.

11. A yokeless stator for an axial flux electrical machine, comprising:
    a housing comprising a circumferential portion;
    a plurality of discrete stator teeth arranged within the circumferential portion, each discrete stator tooth comprising a ferromagnetic material and an electrical winding wound around said ferromagnetic material;
    the housing further comprising a plurality of elongated portions extending in a radially inward direction from said circumferential portion,
    the elongated portions having a proximal end being mechanically connected to the circumferential portion and being in thermal contact with said circumferential portion, and having a distal portion or distal end being physically located between the electrical windings of adjacent stator teeth;
    an electrically isolating filling material filling empty space within said circumferential portion between said plurality of stator teeth and said plurality of elongated portions, wherein said circumferential portion of said housing is made of a first non-ferromagnetic material and said elongated portions are made of a second non-ferromagnetic material, wherein said housing comprises a laminated structure, said laminated structure comprising at least some of said plurality of inwardly directed elongated portions, and wherein an inner wall of said circumferential portion of said housing comprises a plurality of notches or grooves for mounting said plurality of elongated portions.

12. The stator according to claim 11, wherein said laminated structure comprises a plurality of comb-shaped elements forming at least some of said plurality of inwardly directed elongated portions.

13. A method of producing a yokeless stator for an axial flux electrical machine, comprising the steps of:
a) providing a stator housing comprising a circumferential portion made of a first non-ferromagnetic material and a plurality of elongated portions made of a second non-ferromagnetic material and extending from said circumferential portion in a radially inward direction, the elongated portions having a proximal end which is mechanically connected to the circumferential portion and is in thermal contact with said circumferential portion,
the elongated portions being adapted for defining a plurality of cavities for receiving a plurality of discrete stator teeth;
at least some of said elongated portions being comprised in a laminated structure of said stator housing,
b) arranging a plurality of discrete stator teeth in said plurality of cavities, each discrete stator tooth comprising a ferromagnetic material or ferromagnetic core and an electrical winding wound around said ferromagnetic material or ferromagnetic core;
c) increasing a temperature of the arrangement to a temperature in the range from 50° C. to 250° C., and while maintaining this temperature, filling empty space within said circumferential portion with an electrically isolating filling material;
d) allowing the filling material to harden and/or cure.

14. The method of producing a yokeless stator according to claim 13, wherein the step of providing the housing comprises
stacking a plurality of laminations on top of each other, at least some of said laminations having a shape comprising a circumferential portion and a plurality of elongated portions extending from said circumferential portion in a radially inward direction.

15. The method of producing a yokeless stator according to claim 13, wherein the step of providing the housing comprises
stacking a plurality of laminations on top of each other, at least some of said laminations having a shape comprising a circumferential portion and a plurality of notches for mounting one or more of said plurality of elongated portions comprised in a comb-shaped element, or
providing an integral annular body comprising a plurality of notches or grooves for mounting one or more of said plurality of elongated portions comprised in a comb-shaped element; and
wherein the method further comprises mounting said comb-shaped elements to the circumferential portion of said stator housing by means of welding, soldering, brazing, press fitting or gluing.

16. A method of producing an axial flux electrical machine, comprising the steps of:
producing a yokeless stator according to the method of claim 13;
rotatably mounting one or more rotors to the yokeless stator.

17. The method of producing a yokeless stator according to claim 13, wherein the step of providing the housing comprises stacking a plurality of laminations on top of each other, a first group of said laminations having a first shape comprising a circumferential portion and a plurality of elongated portions extending from said circumferential portion in a radially inward direction, a second group of said laminations having a shape comprising only an outer circumferential portion without elongated portions extending from said circumferential portion in a radially inward direction.

18. The method of producing a yokeless stator according to claim 13, wherein the step of providing the housing comprises stacking a plurality of laminations on top of each other, at least some of said laminations having a shape comprising a circumferential portion and a plurality of notches for mounting one or more of said plurality of elongated portions comprised in a comb-shaped element.

19. The method of producing a yokeless stator according to claim 13, wherein the step of providing the housing comprises providing an integral annular body comprises a plurality of notches or grooves for mounting one or more of said plurality of elongated portions comprised in a comb-shaped element.

* * * * *